Aug. 6, 1929.  J. SCHMIDT  1,723,211
APPARATUS FOR HANDLING GRANULAR MATERIAL
Filed Aug. 1, 1924    3 Sheets-Sheet 1
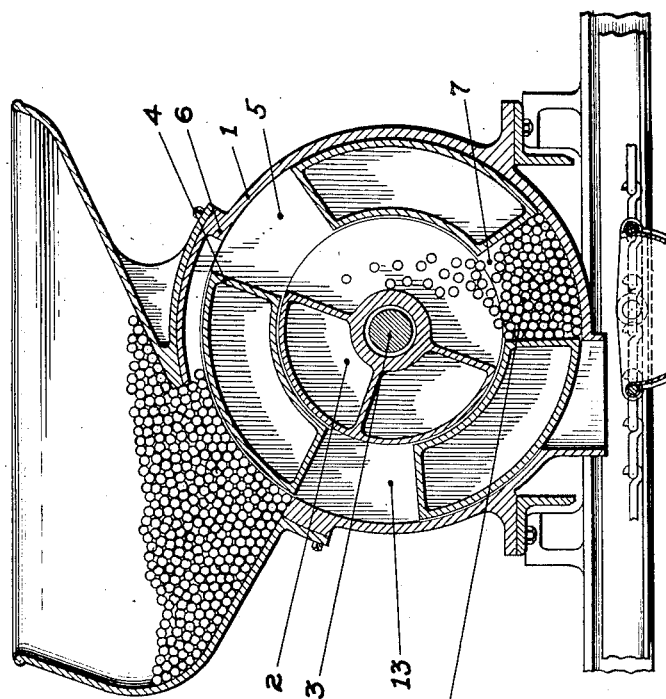
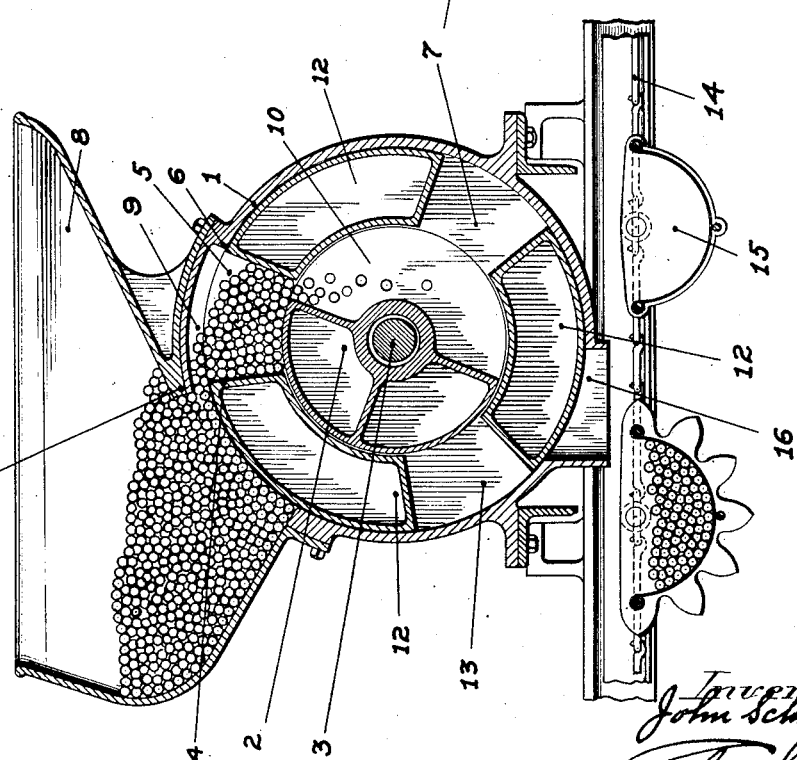

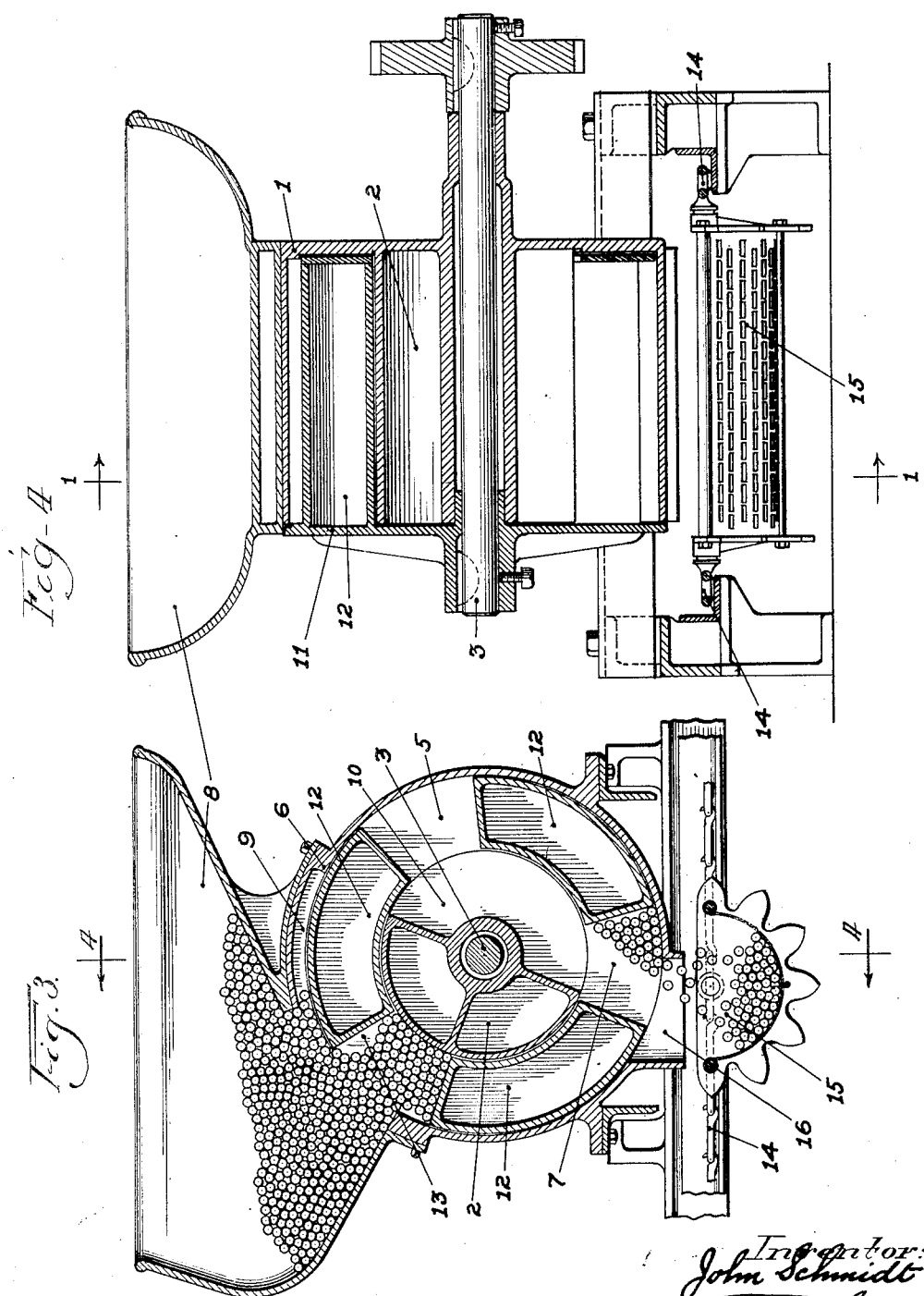

Patented Aug. 6, 1929.

1,723,211

UNITED STATES PATENT OFFICE.

JOHN SCHMIDT, OF HOOPESTON, ILLINOIS, ASSIGNOR TO SPRAGUE-SELLS CORPORATION, OF HOOPESTON, ILLINOIS.

APPARATUS FOR HANDLING GRANULAR MATERIAL.

Application filed August 1, 1924. Serial No. 729,566.

This invention relates to a method and device for measuring and feeding granular materials and is particularly adapted to measuring and feeding green tender peas for canning purposes.

In all previous devices for this purpose it has been practically impossible to measure young and tender peas by automatic means without macerating or damaging them to a more or less extent, due principally to the shearing action of closing measuring devices wherein some of the peas would always get caught and be crushed or otherwise damaged.

This crushing of some of the peas tends to make a messy looking product when in the cans and is detrimental to the grading of the peas by the distributors when cans are opened for inspection. The peas may be of the proper size and quality for "fancies," but if some are crushed or mashed the product will not grade as well as where all of the peas in a can are whole.

It is a principal object of this invention to produce a separating, measuring and feeding device for granular materials comprising a cut off means for the measuring compartment that cannot crush or damage the material.

It is also an object of the invention to provide a measuring and feeding device for granular materials that is continuous in operation, wherein the measuring element moves continuously in the same direction and intermittently discharges a measured quantity of the granular material.

It is also an object of the invention to provide a measuring device having fixed measuring compartments moving successively past an escapement chamber wherein entrapped material may escape and avoid being crushed or damaged.

It is also an object of the invention to provide a measuring and feeding device for granular materials having only one moving element, and that element constituting the measuring and feeding medium, thus simplifying the structure to the minimum.

With such objects in view as well as other advantages inherent in the invention, consisting in the parts and combinations, which will be made the subject matter of claims hereto appended, I wish it understood that the several necessary elements and combinations constituting the same may be varied in their proportions, placements and general arrangement without departing from the scope and nature of the invention.

In carrying out the objects of the invention in a concrete form or machine, further objects, advantages and improvements have been evolved than have been enumerated and in order to make the invention more clearly understood, there are shown, somewhat diagrammatically, in the accompanying drawings, means and mechanism embodying the preferred structural arrangement of the different parts and combinations. In these drawings, however, I have simply shown one way of applying the invention to an operative machine. Other structures might employ some of the parts or combinations without the others in different types of such apparatus, without departing from the purview of my invention and I regard myself as entitled to any and all such variations from the shown and described apparatus as fall within the scope and meaning of the claims hereto.

The drawings accompanying this application are more or less diagrammatic in their arrangement and showing; are not necessarily drawn to scale and are not necessarily representative of the best or the preferred engineering practices in constructing apparatus of this nature.

In the drawings Fig. 1 is a vertical sectional elevation on approximately the line 1—1 of Fig. 4 and clearly shows the general arrangement of the operative elements of the apparatus lying in this sectional plane. The hopper carries a supply of granular material, which may be assumed to represent young and tender peas. A measuring compartment has just passed the opening from the hopper and has accumulated its measured quantity of peas and is just in the position of cutting off the supply showing clearly the formation of the escapement chamber into which the peas may roll without danger of being crushed or damaged. In this view an elevator bucket is shown with a charge of peas passing to a point for further disposition.

Fig. 2 is a similar view to Fig. 1 but showing the measuring element in a more advanced position; the escapement chamber has been fully developed giving the peas free and unimpeded movement therein. The charge of measured peas obtained in Fig. 1 is seen passing into a compartment on the lower side of the measuring element and are just at the point of discharge into one of the elevator buckets.

Fig. 3 is a view similar to Figs. 1 and 2 but showing the measuring element in a still more advanced position. In this view the peas carried by the measuring compartments of Figs. 1 and 2 are seen dropping into an elevator bucket and a new charge of peas are entering a measuring compartment from the hopper.

Fig. 4 is a sectional elevation taken on approximately the line 4—4 of Fig. 3 and shows the relation of the parts on this plane of section and also shows a means of applying power to operate the measuring element.

Figure 5:
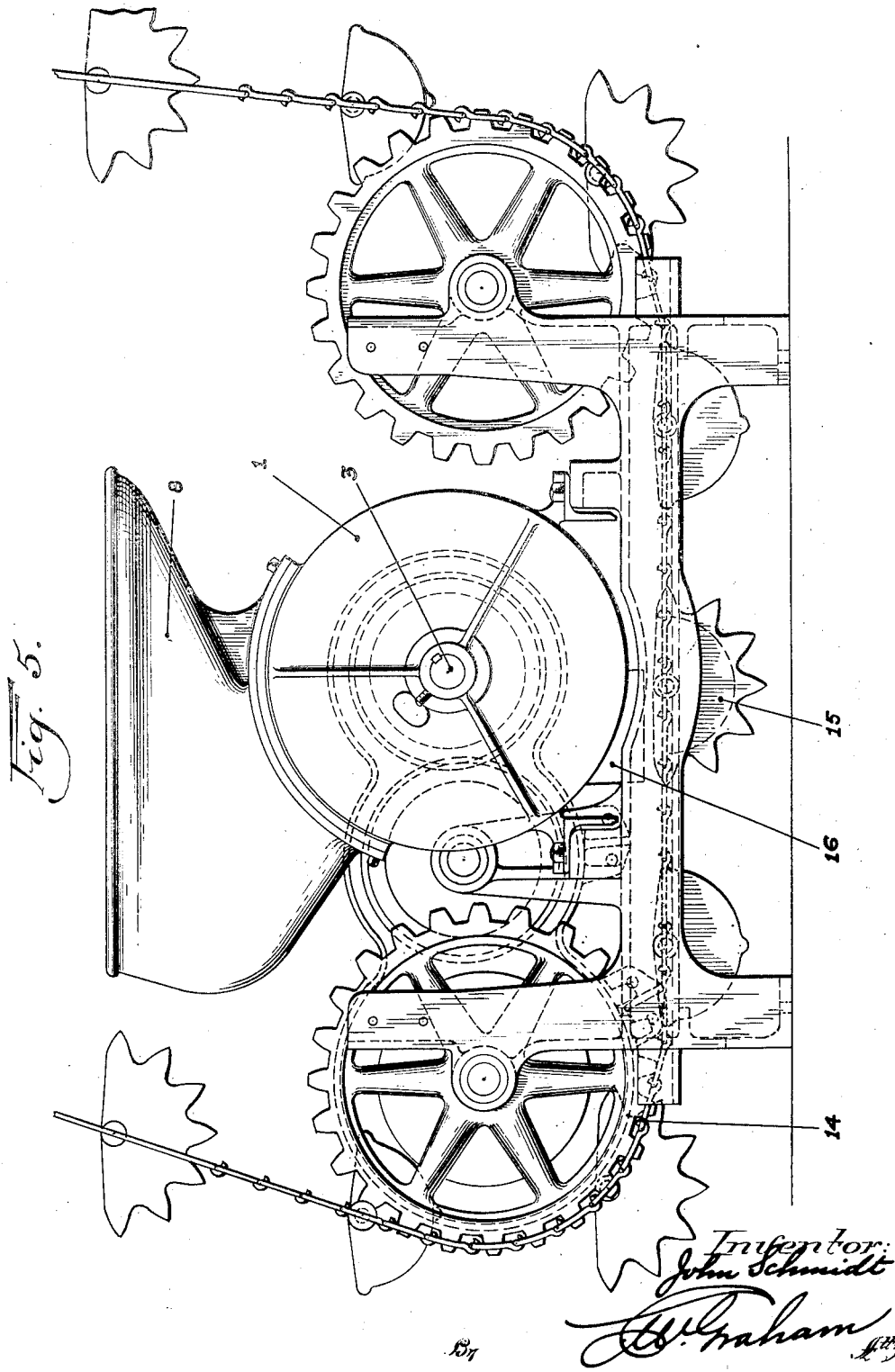
Fig. 5 is a side elevation showing the measuring and feeding device connected in timed relation with the conveyor buckets whereby the measuring chambers are caused to register accurately with the approach of the elevator buckets so the discharged peas will pass into the buckets during their register with the discharge orifice of the measuring apparatus.

The general operative arrangement of this apparatus comprises a stationary central cut off member having an open side; a member rotating around said stationary member and having a plurality of measuring compartments equally spaced apart; a casing in which the stationary and rotative elements are housed, and a supply hopper arranged on the top of the casing. A conveyor chain is mounted to pass under a discharge opening of the casing and carries buckets so spaced on the chain as to accurately time and register with the rotary positions of the measuring compartments in the rotary element.

The principle of cutting off a measured quantity of peas without crushing or damaging due to an abrupt separation by the introduction of a cutting edge or valve slide action, is accomplished through the development of an escapement chamber during the act of separating the measured charge from contact with the supply in the hopper. By means of this escapement chamber there is no abrupt separation of the measured charge and the peas entrapped at the point of separation are enabled to roll into the escapement chamber and thereby escape being crushed or damaged.

A better understanding of the invention may now be had by reference to the accompanying drawings in which like figures of reference represent like parts of the several views.

The numeral 1 represents a casing or housing in which the operative elements of the apparatus are contained. This casing is supported and held in operative position by means of suitable angle brackets. The casing 1 carries a centrally disposed fixed member 2 extending longitudinally and serving as one support for a drive shaft 3 and also acting as a closure member for the bottoms of the measuring compartments during certain of their positions. This member 2 also, through its location and shape forms a cut-off path for the measured peas by means of which they are by-passed from one compartment to another and thus delivered to the elevator buckets without unnecessary contact with the casing walls or corners which may cause damage.

The by-passing of the peas occurs before the rear wall 4 of the measuring compartment 5 reaches the corner wall of the casing 1, Fig. 1 so that the peas are all in the compartment 7, Fig. 2 before these surfaces contact and therefore there can be no damage at this point.

By reference to Figs. 1 and 2 it will be observed that at no time or place are the peas subjected to an abrupt cutting off action. In Fig. 1 the compartment 5 has just passed the opening in the hopper 8 and some peas are shown in the escapement chamber 9, having therein plenty of room for free movement so they are not damaged. At this instant the bottom of the compartment 5 begins to pass over the by-pass 10 and the peas are seen starting to fall into the compartment 7, just completing this transition in Fig. 2.

It will be observed in Fig. 2 that the corner of the compartment wall 4 has not yet reached contact with the corner 6 of the casing 1, when the peas have already escaped into compartment 7 so that they are beyond danger of being crushed at this point.

The member forming the rotary measuring element comprises a disk 11 Fig. 4, keyed to the shaft 3 and carrying measuring compartment members 12, spaced equidistant to form the compartments 5, 7 and 13. The members 12 project inwardly from the disk 11 and rotate around the stationary by-pass member 2, the by-pass member 2 forming a closure for the measuring compartments during the period that peas are entering the compartments from the hopper 8.

The disk 11 and compartment members 12 rotate continuously with the shaft 3 which shaft is driven by any suitable source of power, so that there is a successive sequence of operations of receiving a measured quantity of peas; by-passing them to a more advanced compartment and then discharging them.

An elevator chain 14 carrying buckets 15 moves continuously past the discharge orifice 16 of the casing 1, so that the measured quantities of peas are successively discharged into the buckets 15 as they pass. The measuring compartments and the elevator buckets are so timed in their movements through the medium of the gear connections shown in Fig. 5 that a bucket is always in position under the orifice 16 when the peas begin to discharge as in Fig. 3.

It will be noted by reference to Fig. 2 that the hopper discharge opening is set at one side of the vertical center of the rotary measuring element so that the peas resting here will remain on the inclined periphery of the compartment members 12 and that no peas will be present when the wall 4 and corner 6 meet to close the escapement chamber.

The operation and action of the invention would be substantially as follows, although considerable modification in the apparatus may be made to accomplish the same result.

The hopper 8 having received a suitable supply of peas and the rotary compartment element being in the position of Fig. 1 power is applied to the shaft 3 from any suitable source. The compartment 5 having received a charge of peas is just in position to discharge into the by-pass 10 into compartment 7.

At this time there has been no abrupt cut-off between the compartment 5 and the hopper 8. A partial cut-off has occurred between the corner of the escapement chamber wall 17 and the corner of the compartment wall 4. The escapement chamber 9 is just being developed by the continued rotation of the members 12. This partial cut-off, however, is not abrupt but provides sufficient space for the peas to roll freely into the escapement chamber 9 and over onto the top of the charge of peas in the compartment 5.

No part of the mechanism or walls of the apparatus are in contact with the top of the charge of peas in the compartment 5 at this time and even if peas rolling on top of the charge should tend to build up the surface slightly they yet could never touch the top wall of the escapement chamber 9, because at this instant the bottom of the compartment 5 has just opened into the by-pass 10 and the peas are beginning to drop from the compartment 5, through the by-pass 10 into the compartment 7. The peas will all have passed from compartment 5 into compartment 7 before the wall 4 reaches the position of Fig. 2 just approaching the corner 6 of the casing 1, where, if peas were present they would be damaged.

With the rotary element in the position of Fig. 2 it is seen that the compartment 13 is just about to register with the hopper opening and the compartment 7 is just about to register with the casing orifice 16. Further movement of the rotary element into the position of Fig. 3 shows that the compartment 13 receiving a charge of peas from the hopper and the compartment 7 discharging into a bucket 15 of the elevator. Further movement of the rotary element will place compartment 5 into the position of compartment 7 of Fig. 1 and compartment 13 into that of compartment 5 when the sequence of events will be repeated.

It might be assumed that this method of measuring peas without an abrupt cut-off for the measuring compartment would result in inaccuracy; in practice, however, this does not appear to be the case. While the opening into the escapement chamber is not abrupt it is, however close enough to prevent more than a very few peas to enter the measuring compartment after the compartment is filled and the elements 12 begin to form the escapement chamber. Then too the fact that the peas that are cut off will tend to roll back down the peripheral incline of the members 12 passing under the hopper opening will in a very large measure prevent more than the measured quantity to enter the compartments.

By this improved method and apparatus for measuring and handling tender peas a much more perfect product goes into the cans and a very great saving in destroyed and mutilated product is accomplished as well as the probability of a much higher grading in the hands of the distributors.

Having described my invention what I claim as new and desire to secure by Letters Patent is:

1. An apparatus for measuring and handling granular material comprising a rotary member consisting of portions of two concentric cylindrical walls connected by means of radial walls which extend longitudinally of said member thus dividing it into a plurality of measuring compartments open at top and bottom, a member around which said rotary member moves having a wall portion forming a bottom for said measuring compartments during a portion of their travel, and another wall portion shaped to form a by-pass for the discharge of material from said measuring compartments.

2. An apparatus for measuring and handling granular material comprising a rotary member consisting of portions of two concentric walls connected by means of radial walls which extend longitudinally of said member thus dividing it into a plurality of measuring compartments open at top and bottom, a member around which said rotary member moves having a wall forming a bottom for said measuring compartments during a part of their travel, and another wall shaped to form a by-pass for the discharge of material from one compartment through another compartment while passing from said apparatus.

3. An apparatus for measuring and handling granular material comprising a series of measuring compartments, a source of material supply located above said compartments, means for moving said compartments in relation to said material supply to receive charges therefrom, a member forming bottom closures for said measuring compartments during the time they are receiving charges from said supply, the same member forming a by-pass for the discharge of material from one compartment through another compartment while passing from said apparatus.

4. An apparatus for measuring and handling granular material comprising a series of measuring compartments, a source of material supply, means for moving said measuring compartments in relation to said material supply to receive measured charges therefrom, a member located along the path of movement of said compartments and positioned to form bottom closures for said compartments during the time they are receiving charges from said supply, the same member being shaped to direct the discharge of material from a compartment through a previously emptied compartment, with a discharge orifice located to permit passage of the material from the last mentioned compartment.

5. An apparatus for measuring and handling granular material comprising a rotary member consisting of a plurality of measuring compartments normally open at top and bottom, a fixed member adjacent said rotary member having a wall in the plane of rotation of said compartments to form temporary bottoms therefor during the time of receiving material, said fixed member also having a wall positioned relative to two of said compartments during a portion of their travel to form a by-pass for the discharge of material through said two compartments and from said apparatus.

6. An apparatus for measuring and handling granular material comprising a hopper for a source of supply, a casing underneath said hopper, an opening connecting the two, a rotary member consisting of a series of measuring compartments open at top and bottom, an escapement chamber one wall of which is fixed with said hopper and the other wall is formed by a spacing member between said measuring compartments into which granular material in excess of the measured quantity may freely flow, a fixed member around which said compartments rotate and successively receive charges from said hopper, said fixed member forming bottom closures for said compartments while they are receiving their charges, a by-pass through said fixed member permitting the discharge of material from one compartment through the compartment just in advance and an orifice for permitting the material to pass from the apparatus.

7. An apparatus for measuring and handling granular material comprising a hopper for containing a supply of granular material, a casing having connection with said hopper and an orifice for the discharge of material, a semi-cylindrical centrally positioned member, a series of walled members spaced to form measuring compartments and adapted to rotate around said semi-cylindrical member, the cylindrical portion of said semi-cylindrical member acting to form bottom closures for said measuring compartments during the time of their passage adjacent the opening into said hopper and while receiving material therefrom, each of said walled members successively forming with said semi-cylindrical member a by-pass by means of which the charges of measured material are discharged from the apparatus through the discharge orifice.

8. An apparatus for measuring and handling granular material comprising a hopper for containing a supply of material, walled members spaced to form measuring compartments with open top and bottom and mounted to rotate adjacent said hopper, a semi-cylindrical fixed member around which said walled members rotate and which forms bottom closures for the compartments during a portion of their travel, each of said walled members, in succession, when opposite said semi-cylindrical member forming therewith a path for the discharge of material from said apparatus.

9. An apparatus for measuring and handling granular material comprising a hopper for containing a supply of material, a casing opening into said hopper and having a discharge opening, a series of walled members spaced to form measuring compartments and moving to successively pass said hopper and discharge opening, a fixed member around which said walled members rotate and which forms bottom closures for said compartments during a portion of their travel, said walled members and said fixed member forming a pathway for the discharge of material from said compartments as said walled members rotate around said fixed member.

10. An apparatus for measuring and handling granular material comprising a hopper for containing a supply of material, a rotary member having a series of measuring compartments adapted to pass said hopper and receive charges therefrom, a fixed member around which said rotary member revolves having the dual function of forming bottom closures for the compartments during a portion of their travel and for forming a by-pass path for the discharge of material from the measuring compartments during another portion of their travel.

11. An apparatus for measuring and handling granular material comprising a hopper for containing a supply of material, a series of measuring compartments moving past said hopper and receiving charges therefrom, an escapement chamber formed by the walls of said hopper and the walls separating said compartments where material in excess of the measured charges may move without being crushed, a fixed member around which said compartments move and which has the dual function of forming bottom closures for the compartments during a portion of their travel and for forming a by-pass path for the discharge of material from the measuring compartments during another portion of their travel.

12. An apparatus for measuring and handling granular material comprising means for delivering measured charges of granular material comprising a bucketed elevator for receiving and moving individual portions of material, a measuring device comprising a hopper, a casing and a discharge orifice, a fixed member positioned within said casing, a rotary member comprising walled portions spaced to form measuring compartments and positioned to rotate around said fixed member, an escapement chamber for receiving excess material from the measured charges, said fixed member forming a path with said walled portions for by-passing the measured charges from a compartment into and through another compartment to discharge through said orifice into the buckets of said conveyor.

In testimony whereof I affix my signature.

JOHN SCHMIDT.